United States Patent
Istomin et al.

(10) Patent No.: US 11,934,405 B2
(45) Date of Patent: Mar. 19, 2024

(54) METHOD FOR MONITORING USER BEHAVIOR WHEN INTERACTING WITH CONTENT AND A SYSTEM FOR ITS IMPLEMENTATION

(71) Applicant: Alemira AG, Schaffhausen (CH)

(72) Inventors: Dmitrij Vladimirovich Istomin, Singapore (SG); Alexander Borisovich Khalfin, Tel-Aviv (IL); Andrej Sergeevich Sheka, Novouralsk (RU)

(73) Assignee: Alemira AG, Schaffhausen (CH)

( * ) Notice: Subject to any disclaimer, the term of this patent is extended or adjusted under 35 U.S.C. 154(b) by 731 days.

(21) Appl. No.: 16/647,470

(22) PCT Filed: Oct. 9, 2017

(86) PCT No.: PCT/RU2017/000747
§ 371 (c)(1),
(2) Date: Mar. 13, 2020

(87) PCT Pub. No.: WO2019/054894
PCT Pub. Date: Mar. 21, 2019

(65) Prior Publication Data
US 2020/0278970 A1    Sep. 3, 2020

(30) Foreign Application Priority Data

Sep. 13, 2017 (RU) .................... 2017132098

(51) Int. Cl.
*G06F 11/00* (2006.01)
*G06F 11/30* (2006.01)
(Continued)

(52) U.S. Cl.
CPC ...... *G06F 16/24558* (2019.01); *G06F 11/302* (2013.01); *G06F 11/3438* (2013.01); *G06F 16/2379* (2019.01); *G06F 21/32* (2013.01)

(58) Field of Classification Search
None
See application file for complete search history.

(56) References Cited

U.S. PATENT DOCUMENTS 8,301,701 B2 * 10/2012 Goodman ............. H04L 63/104
                                                            709/206
9,786,113 B2    10/2017 Carey
(Continued)

FOREIGN PATENT DOCUMENTS

AU    2016205850 A1 *  7/2017  ............... A61B 3/16
JP    2017538186 A  * 12/2017
RU     2673010 C1     11/2018

*Primary Examiner* — Tuankhanh D Phan
(74) *Attorney, Agent, or Firm* — ESPE Legal Consultancy FZ-LLC

(57) ABSTRACT

The present invention relates to information technology and can be used for monitoring the behavior of a user during interaction with content in order to obtain relevant feedback from content consumers, inter alia, based on non-verbal signals. The technical result is that of simplifying the procedure for transmitting user behavior data from a user device to a server, and at the same time speeding up said procedure. The system comprises a server equipped with a database and a central unit for storing conditions of the occurrence of user behavioral events, and at least one user device equipped with a data collection unit, an event recognition unit, and a local unit for storing conditions of the occurrence of user behavioral events. The data collection unit is intended for the collection of primary data. The event recognition unit is intended for extracting features of user behavioral events, generating a vector of values of said attributes, correlating said vector with predetermined conditions of the occurrence of events, and transmitting data about the occurrence of an event to the server.

16 Claims, 3 Drawing Sheets

(51) Int. Cl.
 *G06F 11/34* (2006.01)
 *G06F 16/23* (2019.01)
 *G06F 16/2455* (2019.01)
 *G06F 21/32* (2013.01)

(56) References Cited

U.S. PATENT DOCUMENTS

| | | |
|---|---|---|
| 2007/0124202 A1 | 5/2007 | Simons |
| 2008/0319827 A1 | 8/2008 | Yee et al. |
| 2014/0337128 A1 | 11/2014 | Carobus et al. |
| 2016/0022193 A1 | 1/2016 | Rau et al. |
| 2016/0128617 A1* | 5/2016 | Morris ................. G06Q 10/103 |
| | | 434/236 |

* cited by examiner

METHOD FOR MONITORING USER BEHAVIOR WHEN INTERACTING WITH CONTENT AND A SYSTEM FOR ITS IMPLEMENTATION

CROSS REFERENCE TO RELATED APPLICATIONS

This patent application is a U.S. National Phase filing of commonly owned and pending PCT Application No. PCT/RU2017/000747, filed Oct. 9, 2017, claiming priority from Russian Patent Application No. RU 2017132098, filed Sep. 13, 2017, now Russian Patent RU 2,673,010 all which are incorporated herein by reference in their entirety.

TECHNICAL FIELD

The claimed group of inventions relates to information technologies and can be used to monitor user behavior when interacting with content in order to obtain feedback from content consumers, including on the basis of non-verbal signals in education, marketing, sociology, and production management. Such content may be educational materials, including multimedia online lectures and distance testing materials, as well as materials of marketing and sociological research.

PRIOR ART

The current level of development of information technology (IT) determines the development trends of science and technology in most services and industry, including modern academic and corporate education.

The use of modern information and communication technologies to support the educational process is currently one of the most dynamically developing IT applications, since it enables solving a significant number of problems associated with the use of distance learning technologies. Such problems may include automating the collection, recording and analysis of data on performance of trainees, automating observation of the course of distance testing, improving the efficiency and measuring the effectiveness of the learning process itself and, importantly, assessing students' satisfaction with the educational process itself in the online mode These problems can be partly solved by applying technologies related to learning management systems (LMS), remote supervision during verification tests (proctoring), online lectures-webinars, etc.

However, in most cases, in particular in K-12 and corporate training, control of final tests does not solve the main task: to raise the level of student performance. In addition, for some disciplines and subjects, final tests cannot be conducted in an online format.

Existing technical solutions allow use of data about students collected during the training process such as to detect dishonest behavior during examinations and tests, or they do not use all channels to obtain useful data about students as, for example, in the case of biometric data. A common problem of such technical solutions is also that of collecting redundant data on file servers, such as raw audio and video data, which for objective reasons occupy a significant amount of data storage volume. As a consequence, the above factors lead to excessive load on the communication channel between the user device and the application server and to limitations in processing of primary data imposed by the server hardware.

It should be noted that the problems identified above are essentially characteristic of not only the educational process but also research, such as in marketing and sociology, i.e. in areas where the user must interact with multimedia content provided online in order to meet the goals set.

Thus, there is a need to create a method and a system for collecting data on user behavior when interacting with online content that rationally use the computing power of servers and bandwidth of communication channels, and that are also designed to obtain relevant feedback from the user, for example:

obtaining and analyzing data on the degree of involvement of students in an online lecture/webinar;

obtaining and analyzing data on the degree of involvement of students in taking online courses (including MOOC);

obtaining and analyzing data on the student's behavior.

A system is known from the prior art for monitoring the course of an examination (US patent application US 2014/0240507 A1), done with the possibility of facial tracking and recognition, tracking a computer monitor, speech recognition, and detection of active windows during the exam. The observation is done using two cameras, one worn by the person being tested, the second installed with the possibility of capturing the person's face. However, in this system all video data are collected on the proctoring server, which can lead to excessive loading of the communication channel and needless accumulation of multimedia data on the server.

A method is known for collecting data on user behavior when viewing online content (US patent application US 2007/0124202) that collects data on user actions when viewing content, including those done using the focus and blur methods of the JavaScript language. However, this method involves collecting actions that are solely due to actions on the website, such as how often a user scrolls on a page, minimizes/maximizes windows, or switches between different applications.

A method is known for displaying advertising based on collecting data on user behavior (US patent application US 2014/0337128) intended to collect feedback from the user based on their behavior on the website. The method involves collecting data on user preferences when interacting with advertisements placed on the website and sending the data to the server, where they are stored in an aggregated form. However, this method does not involve collecting biometric data of users from which one could judge emotions (such as level of attention or engagement) that the user experiences when viewing content.

A method is known for measuring the level of the user's attention (US patent application US 2017/171620). The method involves transmitting content to user devices and receiving feedback from such devices in the form of data on whether users interact in any way with the content or refuse to view it, thus allowing assessment of the level of attention and involvement of users in the process of interaction with the content. However, when implementing this method it is impossible to collect user biometric data allowing judgment of, for example, the level of user involvement in interacting with content, and the primary data from user devices are transmitted to the central computing node for subsequent processing.

DISCLOSURE OF THE INVENTION

The tasks the present invention is intended to solve are:
expanding the arsenal of tools for monitoring user behavior when interacting with content;

ensuring monitoring of user actions when interacting with content;

relieving the communication channel;

reducing the amount of stored data on user behavior on the server and lowering the technical requirements for server hardware during data processing.

The technical result consists of simplifying the procedure for transmitting user behavior data from a user device to a server, while also speeding up said procedure.

A user device is understood as any device capable of providing content for a user, including desktops, laptops, tablets, smartphones, gaming consoles, or smart TVs.

Content is understood as content of any type and form, including text, audio, video, interactive applications, or games.

An attribute is understood as a measurable property or characteristic of the observed phenomenon.

According to the first aspect of the claimed invention, the technical result is achieved by the method of monitoring user behavior when interacting with the content including the steps that:

primary data are collected on each user device by means of software and hardware of the user device;

attributes of user behavior events are retrieved from the collected data;

a vector of values of such attributes is formed;

the generated vector of values of attributes is compared with the conditions of occurrence of the user behavior predefined on the user device;

if in such a comparison a match is found for the vector of values of attributes for at least one condition for the occurrence of the event, data on the occurrence of such an event are transmitted to the server;

data on the occurrence of such an event are written into the database on the server.

In the preferred embodiment of the invention primary data are collected, including data on user actions performed using the hardware and software of the user device, user biometric data, and data on the user's environment. These data can essentially be collected in the form of audio and video data or graphic and text data, including user biometric data, but are not limited to such forms.

In the particular embodiment of the claimed invention, an additional biometric identification of the user is performed by comparing the primary data obtained, which are the user's biometric data, with the corresponding reference biometric data.

In another particular case, the aggregation of the data obtained on the events of the user's behavior is done with accumulation of a significant amount of such data in the database on the server.

According to the second aspect of the claimed invention, the technical result is achieved by the system for monitoring user behavior when interacting with content containing:

a server equipped with a database and a central storage unit of conditions for the occurrence of user behavior events;

at least one user device connected to the server, wherein such a device is equipped with:

a data collection unit designed to:

conduct collection of primary data through hardware and software of user devices;

an event recognition unit associated with the data collection unit and designed for:

extraction of attributes of events of user behavior from the collected data;

formation of a vector of values of such attributes;

comparisons of the formed vector of values of attributes with the preset conditions for the occurrence of events of user behavior;

transmittal of data on the occurrence of an event to the server, if in the comparison a match was found for the vector of values of attributes with at least one condition for the occurrence of the event;

a local storage unit for the conditions of occurrence of user behavior events associated with the event recognition unit and a central unit for storing conditions for the occurrence of user behavior events.

In the preferred embodiment of the invention, the data collection unit is configured to carry out the collection of primary data, including data on user actions performed using the hardware and software of the user device, user biometric data, and environmental data of the user. These data can essentially be collected in the form of audio and video data or graphic and text data, including user biometric data, but are not limited to such forms.

In the particular embodiment of the claimed invention, the server is additionally equipped with a central unit for storing reference biometric data;

and at least one user device additionally equipped with:

a local unit for storing reference biometric data associated with a central unit for storing reference biometric data;

a user biometric identification unit associated with the local storage unit of reference biometric data and intended for comparison of primary data, which are biometric data, with reference biometric data;

transmittal of data on the occurrence of the event to the server, which is the event of the biometric identification of the user.

In another particular case, the server is additionally equipped with a data aggregation unit connected to the database and intended to aggregate the received data on the user's behavior events when a significant amount of such data accumulates in the database on the server.

The events of user behavior for the purposes of this application should be understood as events of user behavior including connecting additional hardware to the user device, invoking unauthorized software on such a device, the appearance/change of emotion on the user's face, change of direction of the user's gaze, and a successful/unsuccessful event of user identification, but they are not limited to these listed events.

Data on events of user behavior for the purposes of this application should be understood as attributes of events of user behavior, including event identifier, event name, time point or time interval of an event, and the values of event attributes, but they are not limited to these listed attributes.

It should also be noted that it is expedient to transmit to the server data on user behavior events having a nonzero (non-empty) value and with a predetermined frequency.

BRIEF DESCRIPTION OF THE DRAWINGS

The essence of the technical solution is illustrated by drawings, which explain but do not limit the claimed invention, where:

IMPLEMENTATION OF THE INVENTION

In practice, monitoring user behavior when interacting with content is designed to solve a number of tasks related to obtaining relevant feedback from a consumer of such content; for example, a pupil, student, job seeker, or participant in marketing or sociological research. To solve these problems, the present invention can be used as part of more general-purpose systems.

Using the present invention in online proctoring systems to control examination tests solves the problem of automatic recognition of typical student behavior events, thus allowing a higher level of confidence in documents confirming that such a test has been passed.

When using the present invention in personnel management systems the task of automated control of testing of applicants is solved, including confirmation of independence when testing and using the authorized means.

When using the present invention in testing systems to obtain certification of vendors, the task of assessing the true quality of knowledge of IT professionals is solved.

When using the present invention in learning management systems, the task of informing the lecturer about the user's degree of involvement and level of attention when participating in an online lecture/webinar and a massive open online course is solved.

When using the present invention in production control systems, the task of monitoring the operator's involvement in the production process is solved; for example, when working with hazardous facilities such as nuclear power plants, escalators, and production equipment. Signals about loss of concentration or operator's absence can be delivered to management or transferred to the controller.

The present invention can also be used when conducting marketing or sociological research to monitor human involvement and analyze additional factors (skin color, gender, age, etc.).

Figure 1:
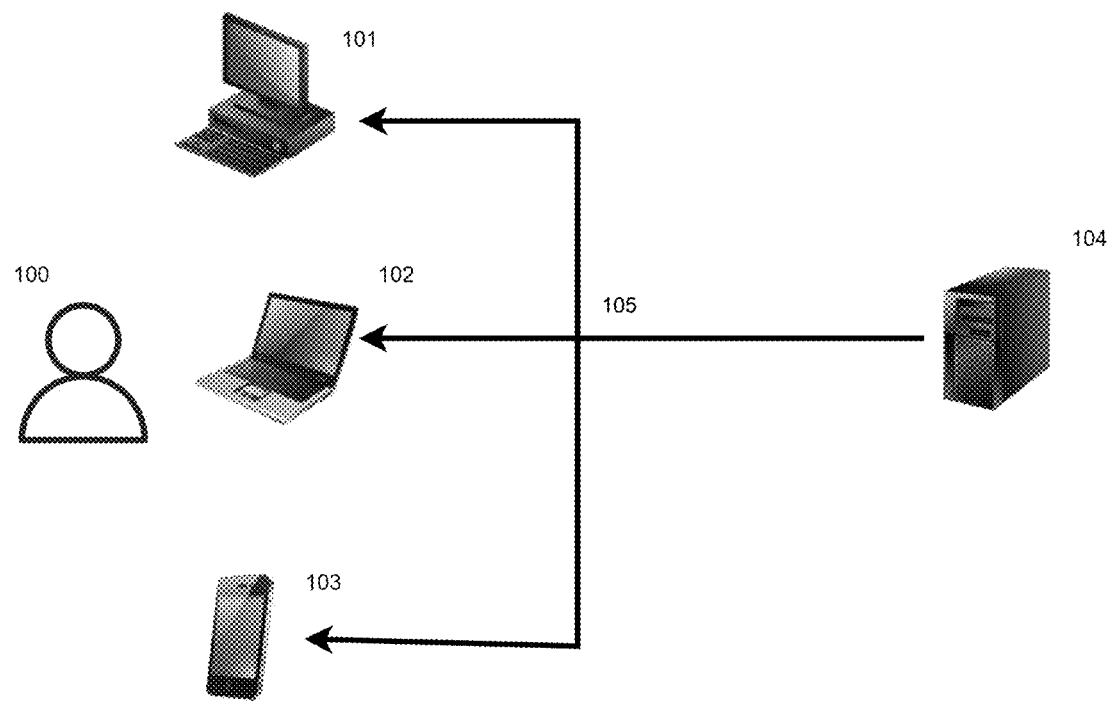
FIG. 1 is a functional diagram of monitoring user behavior when interacting with content in a computer network.

The functional diagram of monitoring user behavior when interacting with content in a computer network is depicted in FIG. 1. In accordance with the described examples, the user 100 may be, among others, a student, an applicant, or an operator. Personal computers 101, laptops 102, portable devices 103 are user devices (101-103) and can be connected to server 104 via a communication channel 105. The server 105, user devices (101-103), and corresponding network connections can form a local area network (LAN) or be part of a wide area network (WAN). The communication channel 105 may include network interfaces of user devices (101-103) and server 105, switching and routing devices, and wired and wireless communication lines. Data exchange between these devices can occur according to a standard protocol stack such as TCP/IP.

In the preferred embodiment of the invention, the user device (101-103) is provided with a means of recording video data such as a web camera, a means of recording audio data such as a microphone, and a means of recording the desktop, and these means may be external to the user device (101-103) or built-in.

In the particular embodiment of the invention, the user device is provided with means for reading biometric data that can be, inter alia, a fingerprint scanner, a webcam or a microphone.

Before starting the session of interaction with content during some event, the user 100 is given the opportunity to preliminarily check the technical parameters of the user device (101-103) and the network with respect to the possibility of participating in the event in accordance with its rules. Without successfully passing a preliminary check, user 100 might, for example, not receive access to take the exam.

Figure 2:
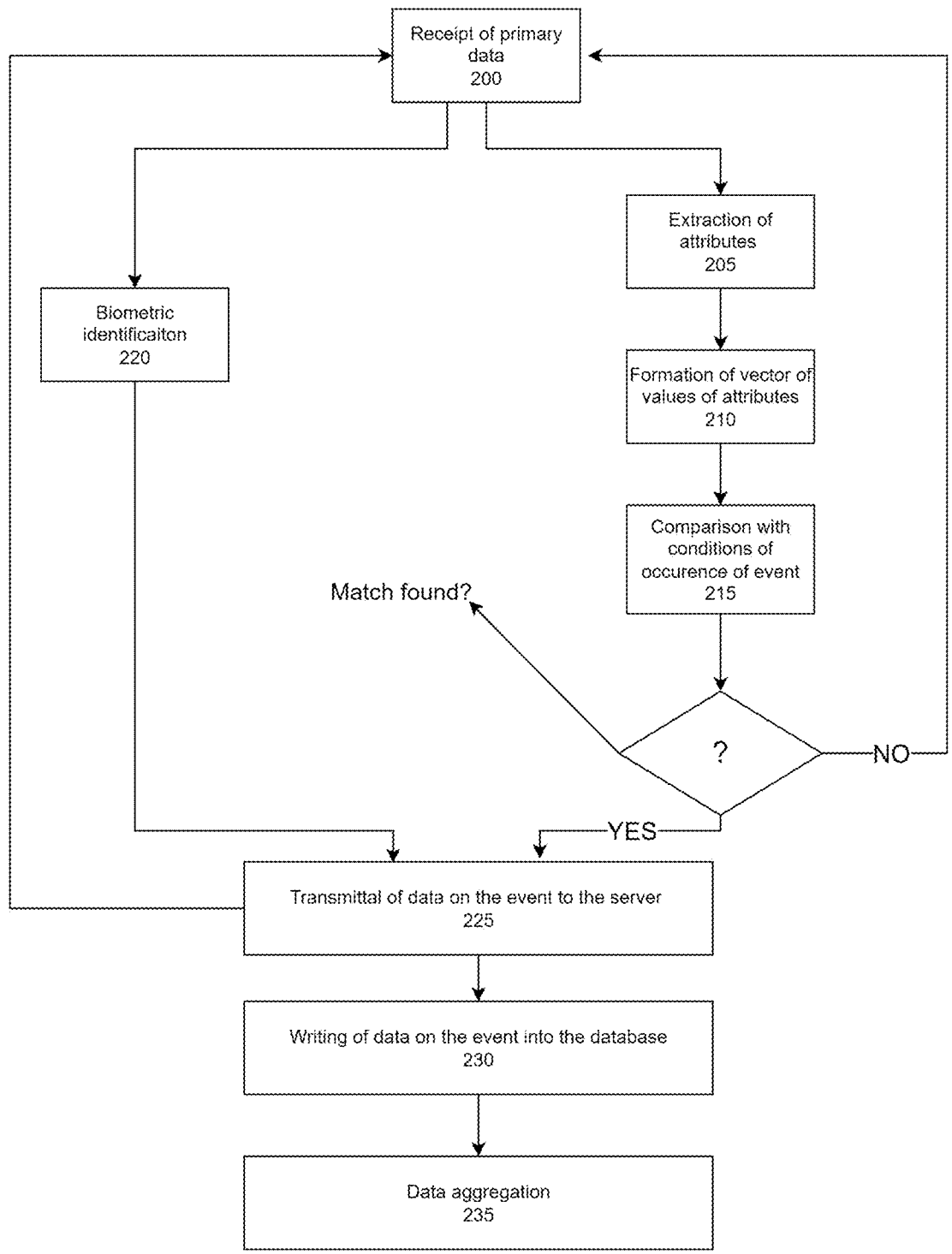
FIG. 2 is a block diagram of a system for monitoring user behavior when interacting with content.

A block diagram of a method for monitoring user behavior when interacting with content is depicted in FIG. 2.

Performing the actions in the method begins with collecting primary data 200 by means of software and hardware of user devices (101-103). Preferably, the primary data include data about the actions of the user 100 performed using the hardware and software of the user device (101-103), biometric data of the user 100, and data about his environment. The specified data can essentially be collected in the form of audio and video data or graphic and text data, including biometric data, but they are not limited to such forms.

Then, the signs of user behavior events are extracted from the collected data 205 and a vector of values of such attributes 210 is formed. Each behavior event is several dimensions in the vector. Suppose that for an event i, N values of signs in a vector are defined. Then the value from the vector V: V (i, 1), ..., V (i, N), which corresponds to the instants of time is responsible for the event i.

For example, a vector of values of attributes describing the coordinates of the key points of the user's face can be formed in the following general form: $[x_1, y_1, \ldots x_m, y_m]$, $x \in [0, W]$, $y \in [0, H]$, where m is the number of key points of the face;

W is the maximum value of the horizontal coordinate;

H is the maximum value of the vertical coordinate.

A vector of values of attributes describing the angle of rotation of the user's head: [roll, yaw, pitch], where variables take values from the range from −90° to 90° or from 0° to 180° in height, width and depth.

A vector of values of attributes describing the level of user involvement in the process of interaction with content: [e, a], e, a∈[0, 100], where e is the level of expression of the user's face;

a is the level of attention of the user.

A vector of values of attributes describing the number of additional devices of arbitrary assignment simultaneously connected to the user device at a specific time: [d], where d is the number of devices.

The list of events and the corresponding conditions for the occurrence of the event can be downloaded to the user device (101-103) from the server 104 before the start of the event when the user interacts with the content in accordance with the rules of such an event.

Depending on the event rules, user behavior events may include:
  connecting an additional device to the user's device, such as a second monitor;
  changing the direction of the user's gaze;
  changing the number of users in the frame;
  changing the angle of rotation of the user's head;
  changing the expression level of the user;
  appearance of human speech or extraneous noise;
  turning the microphone on or off;
  enabling or disabling the webcam;
  switching the active window.

After formation of the vector of values of attributes, this vector is associated with the preset conditions for the occurrence of events of the user's behavior 215.

In the particular embodiment of the present invention, a biometric identification of the user 220 is conducted by comparing the primary data, the biometric data of the user, with the reference biometric data of the user preloaded on the user device (101-103) or server 104. Events of biometric identification can be:
- successful user identification;
- unsuccessful user identification;
- user's refusal to undergo identification.

If the matching of the vector of values of attributes to at least one condition for the occurrence of an event is found in the mapping 215, the data on the occurrence of such an event are transmitted to the database on the server 225.

Data on the occurrence of the event can be transmitted to the server as a tuple consisting of N values, one value for each attribute of the tuple, such as [date, time, event_code], where event_code is the event code. Additionally, the mentioned tuple may include the values of the vector of attributes. In this case, it is advisable to transmit to the server data on the user behavior having a nonzero (non-empty) value and with a predetermined frequency.

If the correspondence of the vector of values of attributes to any condition for the occurrence of an event was not found, execution of the method's actions is repeated starting with the collection of primary data 200.

The data on the user behavior event are then written into the database on the server 230.

In the particular embodiment of the invention, the aggregation of the obtained data on the user behavior events 235 is carried out with the accumulation of significant amounts of such data in the database on the server.

Performance of the actions in the method ends when the event ends in which the user interacts with the content.

Figure 3:
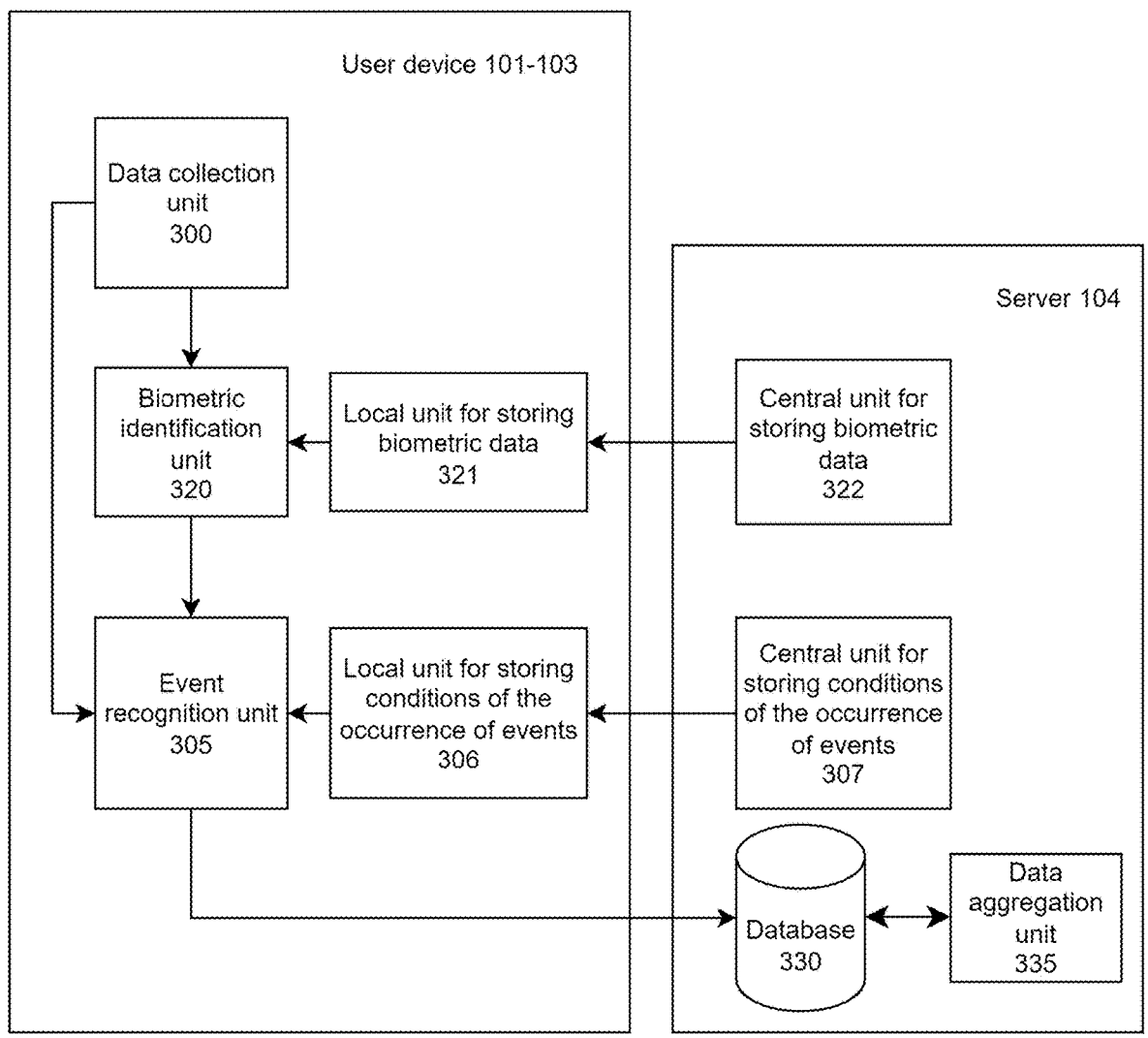
FIG. 3 is a block diagram of a system for monitoring user behavior when interacting with content.

A block diagram of a system for monitoring user behavior when interacting with content is depicted in FIG. 3.

Said system contains at least one user device (101-103) connected to the server 104. Each user device (101-103) is equipped with a data collection unit 300, an event recognition unit 305, and a local storage unit for the occurrence conditions of events 306. The server is equipped with a central storage unit of conditions of occurrence of events 307, a database 330, and a data aggregation unit 335.

In the particular embodiment of the present invention the user device (101-103) is additionally equipped with a user biometric identification unit 320, a local storage unit for reference biometric data 321, and a server 104 with a central storage unit for reference biometric data 322.

The data collection unit 300 is designed to carry out the collection of primary data using the hardware and software of the user device (101-103). Primary data include data on user actions performed using hardware and software of user devices, user biometric data, and data on the user's environment.

During the event, the data collection unit 300 collects data continuously in various forms, such as audio or video data received from the webcam of the user device (101-103). Such data are transmitted to the event recognition unit 305 and/or the biometric identification unit 320.

The event recognition unit of user behavior 305 is intended for extraction of attributes of events of user behavior from the collected primary data; formation of a vector of values of such attributes; comparison of the formed vector of values of attributes with predetermined conditions for the occurrence of user behavior events; and transmittal of data on the occurrence of such events to the server if in the comparison a match is found for the vector of values of attributes to at least one condition for the occurrence of the event.

The local storage unit for the conditions of occurrence of events 306 is intended for storing on the user device preset conditions for the occurrence of events of user behavior that are determined before the start of the event depending on the rules of such an event.

The central unit for storing the conditions of occurrence of events 307 is intended for storing the entire set of conditions for the occurrence of events that can be transmitted to the local unit 306.

The biometric identification unit 320 is designed for matching primary data, which are biometric data, with reference biometric data, and transmitting data on the occurrence of an event to the server, which is a biometric identification event.

The local storage unit of the reference biometric data 321 is intended for storing the reference biometric data of the user on the corresponding user device (101-103).

The central storage unit of the reference biometric data 322 is intended for storing the reference biometric data of the user on the server 104.

The data aggregation unit 335 is designed to aggregate data on user behavior events when a significant amount of such data is accumulated in the database on the server 104. Aggregated data can later be used to study statistics on user behavior such as a student during a lecture, determine the user's level of involvement in the process, or, for example, formation of recommendations to the lecturer to improve the quality of the lecture.

Before the start of an event in which the user interacts with the content, the lecturer, proctor, administrator of the automated system, or another authorized person conducts a selection of those user behavior events that need to be monitored in accordance with the rules of the event. The central event storage unit for the occurrence of events 307 transfers the selected events from the server 104 to the local storage unit of the occurrence of condition of events 306 on the user device (101-103). Thus, during the event only those events that are present in the event's rules will be recognized and transmitted to the server 104. For example, if a student is allowed to use paper or books during an exam the conditions of an event related to changing the direction of a user's gaze will not be loaded into local unit 306.

Introducing local block 306 into the system allows recognition of behavior events on a user device (101-103), which eliminates the need to transfer primary data to the server 104 and allows a significant relieving of the communication channel 105, as well as optimizing the hardware requirements of the server 104. The latter, in turn, will lead to a decrease in server capacity employed during the event.

Introducing an event recognition unit 305 into the system, intended inter alia for transmitting data about events of user behavior to server 104, also allows relieving communication channel 105 and significantly reducing the amount of stored data on user behavior on server 104, since event recognition unit 305 transmits to the server 104 only the data that are stored in a table form. An example of such data may be attributes of user behavior events, including the event identifier, event name, time or time interval of the event occurrence, or values of the event attributes. In addition, in case of loss of communication of the user device (101-103) with the server 104 the procedure for recognizing user behavior events does not stop and may be conducted offline. After the connection with the server 104 is restored, the mentioned data can be transferred to the server 104 in full.

Introduction into the system of the local unit 321 will eliminate the transfer of user biometric data to the server 104, which in turn simplifies the procedure of biometric identification of the user.

Thus, the present invention in its implementation enables the following results to be obtained:
- monitoring user behavior when interacting with content;
- optimizing and accelerating the procedure for transferring data on the user's behavior from the user device to the server;
- relieving the communication channel;
- reducing the amount of stored data on user behavior on the server and lowering the technical requirements for server hardware during data processing.

It should be noted that the information given in the description are examples that illustrate, and do not limit, the scope of the present invention defined by the claim.

INDUSTRIAL APPLICABILITY

The technical result is that the claimed invention is a universal automated system that allows simplifying the procedure of transferring data on user behavior from the user device to the server with simultaneous acceleration of such a procedure. The use of the present invention, for example, in more general-purpose systems, makes it possible to solve problems of automatic recognition of typical events of student behavior and assess the true level of knowledge of specialists and their independence in conducting tests.

The invention claimed is:

1. A method of monitoring user behavior when interacting with displayed content on a user device, comprising the steps of:
storing conditions of occurrence of user events on the user device;
displaying content on the user device to a user;
selectively collecting primary data by means of software and hardware of the user device while content is being displayed to the user by the user device;
storing the collected primary data on the user device;
extracting attributes of user behavior events from the collected primary data;
forming a vector of values of the extracted attributes with an event recognition unit installed on the user device;
comparing the formed vector of values of attributes with the conditions of occurrence of the user's behavior preset on the user device; and
if the vector of values of attributes matches at least one condition for the occurrence of a user behavior event, transmitting, a summary of the primary data to a server on the occurrence of the user behavior event; and
recording the summary of the primary data on the occurrence of the user behavior event in a database in communication with the server and external to the user device.

2. The method of claim 1, wherein the primary data selected for collection comprises biometric data about the user.

3. The method of claim 2, wherein biometric identification of the user is carried out by comparing, on the user device, obtained biometric data and a corresponding reference biometric dataset stored on the user device.

4. The method of claim 1, wherein the user behavior events comprise connecting additional hardware to the user device, invoking unauthorized software on the user device, the changes to the appearance of the user's face, and changes in the direction of the user's gaze.

5. The method of claim 3, wherein the user behavior events comprise events of biometric user identification.

6. The method of claim 1, further comprising the step of transmitting on user behavior events comprising an event identifier, an event name, a time instant or a time interval for the occurrence of an event, and values of event attributes.

7. The method of claim 6, further comprising the step of transmitting nonzero values of data about user behavior events with a predetermined frequency.

8. The method of claim 6 further comprising the step of aggregating data about the user behavior events after accumulating a plurality of user behavior event datasets in the database on the server.

9. A system for monitoring user behavior when interacting with content displayed on a user device, comprising:
a server with a database operably connected to a central storage unit for storing the conditions of occurrence of user behavior events;
at least one user device in communication with the server, wherein the user device is configured to display content to a user and comprises:
a data collection unit configured to collect primary data through hardware and software of the user device while content is being displayed to the user; and
an event recognition unit on the user device configured to extract attributes of user behavior events from collected primary data;
a user storage unit for primary data on the user device;
wherein the event recognition unit is further configured to:
form a vector of values of the extracted attributes;
compare the formed vector of values of attributes with predetermined conditions for the occurrence of user behavior events; and
transmit primary data in only table form on the occurrence of an event to the server, if a match is found for the vector of values of attributes with at least one condition for the occurrence of the event; and
a storage unit on the user device for the conditions of occurrence of user behavior events associated with an event recognition unit and a storage unit for storing conditions for the occurrence of user behavior events.

10. The system of claim 9, wherein the data collection unit is configured to collect primary data comprising-data on user actions performed using the hardware and software of the user device, biometric user data, and data about the user's environment.

11. The system of claim 9, wherein the server is further configured for connection with a central storage unit for reference biometric data and wherein at least one user device is in communication with:
a user storage unit for storing collected reference biometric data and associated with a central unit for storing reference biometric data; and
a user biometric identification unit, associated with the user storage unit of reference biometric data;
wherein the user biometric identification unit is configured to compare
collected primary data, comprising biometric data, with reference biometric data and to transfer a summary of the collected primary data on the occurrence of an event of the biometric identification of the user to the server.

12. The system of claim 9, wherein the event recognition unit of user behavior is configured to recognize events connecting additional hardware to the user device, invoking of unauthorized software on the user device, the change of emotions on the user's face, and change of the direction of the user's gaze.

13. The system of claim 11, wherein the event recognition unit is configured to recognize biometric user identification events.

14. The system of claim 9, wherein the event recognition unit of user behavior is configured to transmit data on behavior events comprising an event identifier, an event name, a time point or time interval for the occurrence of an event, and values of event attributes.

15. The system of claim 14, further comprising a user data transmission unit of user behavior events configured to transmit nonzero values of the data about the user behavior events to the server with a predetermined frequency.

16. The system of claim 14 wherein the server is further configured with a data aggregation unit connected to the database for aggregating received data on user behavior events after accumulating a plurality of user behavior event datasets on the server.

\* \* \* \* \*